United States Patent
Maldonado et al.

(10) Patent No.: US 10,322,348 B2
(45) Date of Patent: Jun. 18, 2019

(54) SYSTEMS, METHODS AND APPARATUS FOR IDENTIFYING PREFERRED SPORTING EVENTS BASED ON FANTASY LEAGUE DATA

(71) Applicant: EchoStar Technologies L.L.C., Englewood, CO (US)

(72) Inventors: Michael Patrick Maldonado, Denver, CO (US); Steven Phillip Hauser, Evergreen, CO (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 0 days.

(21) Appl. No.: 15/139,656

(22) Filed: Apr. 27, 2016

(65) Prior Publication Data
US 2017/0312635 A1    Nov. 2, 2017

(51) Int. Cl.
| A63F 13/338 | (2014.01) |
| A63F 13/65 | (2014.01) |
| A63F 13/335 | (2014.01) |
| A63F 13/46 | (2014.01) |

(52) U.S. Cl.
CPC ........... *A63F 13/65* (2014.09); *A63F 13/335* (2014.09); *A63F 13/46* (2014.09); *A63F 2300/407* (2013.01)

(58) Field of Classification Search
CPC .............................. A63F 13/33; A63F 13/338
See application file for complete search history.

(56) References Cited

U.S. PATENT DOCUMENTS

| 7,779,436 | B1 | 8/2010 | Kamen et al. |
| 8,424,043 | B1 | 4/2013 | McClellen et al. |
| 8,745,661 | B2 | 6/2014 | Ellis et al. |
| 8,854,555 | B2 | 10/2014 | Kashyap et al. |
| 8,949,895 | B2 | 2/2015 | Thompson et al. |
| 2001/0049826 | A1 | 12/2001 | Wilf et al. |
| 2002/0124252 | A1 | 9/2002 | Schaefer et al. |
| 2002/0157101 | A1* | 10/2002 | Schrader ............ H04N 5/4401 725/64 |
| 2003/0093789 | A1 | 5/2003 | Zimmerman et al. |
| 2007/0157246 | A1 | 7/2007 | Phillips et al. |
| 2008/0066111 | A1 | 3/2008 | Ellis et al. |
| 2008/0077959 | A1 | 3/2008 | Kirimura et al. |
| 2008/0229351 | A1 | 9/2008 | Torimaru |
| 2009/0204992 | A1 | 8/2009 | Boyce et al. |
| 2010/0146042 | A1 | 6/2010 | Kruhoeffer et al. |
| 2011/0059799 | A1 | 3/2011 | Hirano et al. |

(Continued)

OTHER PUBLICATIONS

Ardissono, L. et al. "Personalized recommendation of TV programs," Advances in Artificial Intelligence. Springer Berlin Heidelberg, 2003, 12 pages. http://citeseerx.ist.psu.edu/viewdoc/download?doi=10.1.1.67.1277&rep=rep1&type=pdf.

*Primary Examiner* — James S. McClellan
(74) *Attorney, Agent, or Firm* — Perkins Coie LLP (57) ABSTRACT

Various embodiments of systems, apparatus, and/or methods are described for identifying a preferred sporting event. A receiving device receives fantasy league data, sports data, and programming information for candidate sporting events. The receiving device then analyzes the programming information for one or more preferred sporting events based at least in part on the fantasy league data and the sports data. The user may then be notified of the preferred sporting event.

20 Claims, 6 Drawing Sheets

(56) References Cited

U.S. PATENT DOCUMENTS

| | | |
|---|---|---|
| 2011/0292280 A1 | 12/2011 | Sloo |
| 2014/0325556 A1 | 10/2014 | Hoang et al. |
| 2014/0325567 A1* | 10/2014 | Mangat ................ H04N 21/482 725/47 |
| 2014/0351837 A1 | 11/2014 | Amidei et al. |
| 2015/0248917 A1* | 9/2015 | Chang ................ H04N 21/8549 386/282 |

* cited by examiner

| VIEWING PREFERENCES | | |
|---|---|---|
| TEAM 306 | PLAYER 308 | REGION 310 |

302

| STATISTICAL INFORMATION | | | |
|---|---|---|---|
| ACTIVE TEAMS 312 | ACTIVE PLAYERS 314 | GAME SCORE 316 | EVENT LIKELIHOOD 318 |

SYSTEMS, METHODS AND APPARATUS FOR IDENTIFYING PREFERRED SPORTING EVENTS BASED ON FANTASY LEAGUE DATA

BACKGROUND

Receiving devices, such as set-top boxes for satellite and cable television services, allow a user to view an electronic program guide (EPG). The EPG displays a list of audiovisual events, such as sporting events, that are available to viewed at the current date and time, and at future dates and times. The EPG is typically organized by television channels and by date and time. For sporting events, the EPG may indicate the teams playing in a game, and sometimes the location of the game. However, other information about the sporting event, such as score, players, and time left, are not provided by the EPG. Thus, a user typically begins watching the sporting event in order to ascertain whether the event is currently relevant to the user.

SUMMARY

The present disclosure relates to systems, methods, and apparatus for identifying sporting events that are of interest to a user. In one implementation, a method includes receiving fantasy league data; receiving sports data from a sports data provider; receiving programming information for a plurality of candidate sporting events that are available to be viewed; analyzing the programming information for one or more preferred sporting events based at least in part on the fantasy league data and the sports data; and outputting a notification of the one or more preferred sporting events.

In some examples, the method further includes receiving a selection of the one or more preferred sporting events; and displaying the selected sporting event on a presentation device. In some examples, the method further includes automatically recording the one or more preferred sporting events.

In one implementation, a receiving device includes a user communication module to receive fantasy league data; a communication module to receive sports data and programming information for a plurality of candidate sporting events that are available to be viewed; a control logic to analyze the programming information for one or more preferred sporting events based at least in part on the fantasy league data and the sports data; and a rendering module to output a notification of the one or more preferred sporting events.

In some examples, the user communication module receives a selection of the one or more sporting events, and wherein the rendering module outputs the selected sporting event to a presentation device. In some examples, the control logic automatically records the one or more preferred sporting events.

In some examples, the fantasy league data comprises at least one player on a user's fantasy sports team, a grouping of players on the user's fantasy sports team, at least one player on another user's fantasy sports team, a grouping of players on another user's fantasy sports team, scoring rules for the user's fantasy sports league, or a combination thereof. In some examples, the sports data comprises statistics related to the plurality of candidate sporting events available to be viewed. In some examples, the statistics comprise active team statistics, active player statistics, a game score, a likelihood of a comeback, a rivalry, a likelihood of an exciting event, or a combination thereof. In some examples, the notification comprises one or more of a visual notification, an audio notification, and a tactile notification. In some examples, the notification is output by a presentation device. In some examples, the notification indicates one or more player positions, one or more players likely to gain fantasy points, a likelihood of an exciting event, a description of a game's status, a game score, or a combination thereof. In some examples, the sports data provider is a crowd-sourced data source.

It is to be understood that both the foregoing summary and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The same number represents the same element or same type of element in all drawings.

DETAILED DESCRIPTION OF THE DRAWINGS

The various embodiments described herein generally provide apparatus, systems and methods which facilitate the reception, processing, rendering, and outputting of audiovisual content, such as sporting events. More particularly, the various embodiments described herein provide notifications of sporting events that are of interest to a user. The notifications are based on the user's viewing preferences and/or based on an analysis of statistics related to sporting events that are available to be viewed.

In at least one embodiment, the sporting event to be viewed may come in the form of an audiovisual stream. Exemplary audiovisual stream formats include Motion Picture Experts Group (MPEG) standards and the like. It is to be appreciated that the audiovisual stream may be supplied by any source, such as an over-the-air broadcast, a satellite, or cable television distribution system, the Internet, or other communication networks, and the like. In at least one embodiment, the audiovisual stream may be associated with supplemental data that includes text data, such as closed captioning data or subtitles.

Generally, an audiovisual stream is a contiguous block of associated audio and video data that may be transmitted to, and received by, a receiving device, such as a terrestrial ("over-the-air") television receiver, a cable television receiver, a satellite television receiver, an Internet connected television or television receiver, a computer, a portable electronic device, or the like. In at least one embodiment, an audiovisual stream includes a sporting event. The sporting event may be a contiguous block of programming from a television channel (e.g., a scheduled baseball game) or other media content identifiable as a sporting event. For example, the sporting event may correspond to the programming on a single broadcast channel between 7:00 and 8:00.

Further, an audiovisual stream may be delivered by any transmission method, such as broadcast, multicast, simulcast, closed circuit, pay-per-view, on-demand, over-the-top (by "streaming," file transfer, or other means), or other methods. Additionally, the audiovisual stream may be transmitted by way of any communication technology, such as by satellite, wire or optical cable, wireless, or other means. The audiovisual stream may also be transferred over any type of communication network, such as the Internet or other wide area network, a local area network, a private network, a mobile communication system, a terrestrial television network, a cable television network, and/or a satellite television network.

Along with the sporting event, programming information may be transmitted to the receiving device. The programming information includes a list of sporting events (and corresponding television channels or other content sources) that are available for viewing during different time slots. The receiving device may display the programming information as an Electronic Program Guide (EPG). Typically, the EPG can be displayed on a presentation device. In some embodiments, the programming information also contains information about each available sporting event. This information may include information such as event name, participating teams, and estimated start and end times of the event.

Figure 1A:
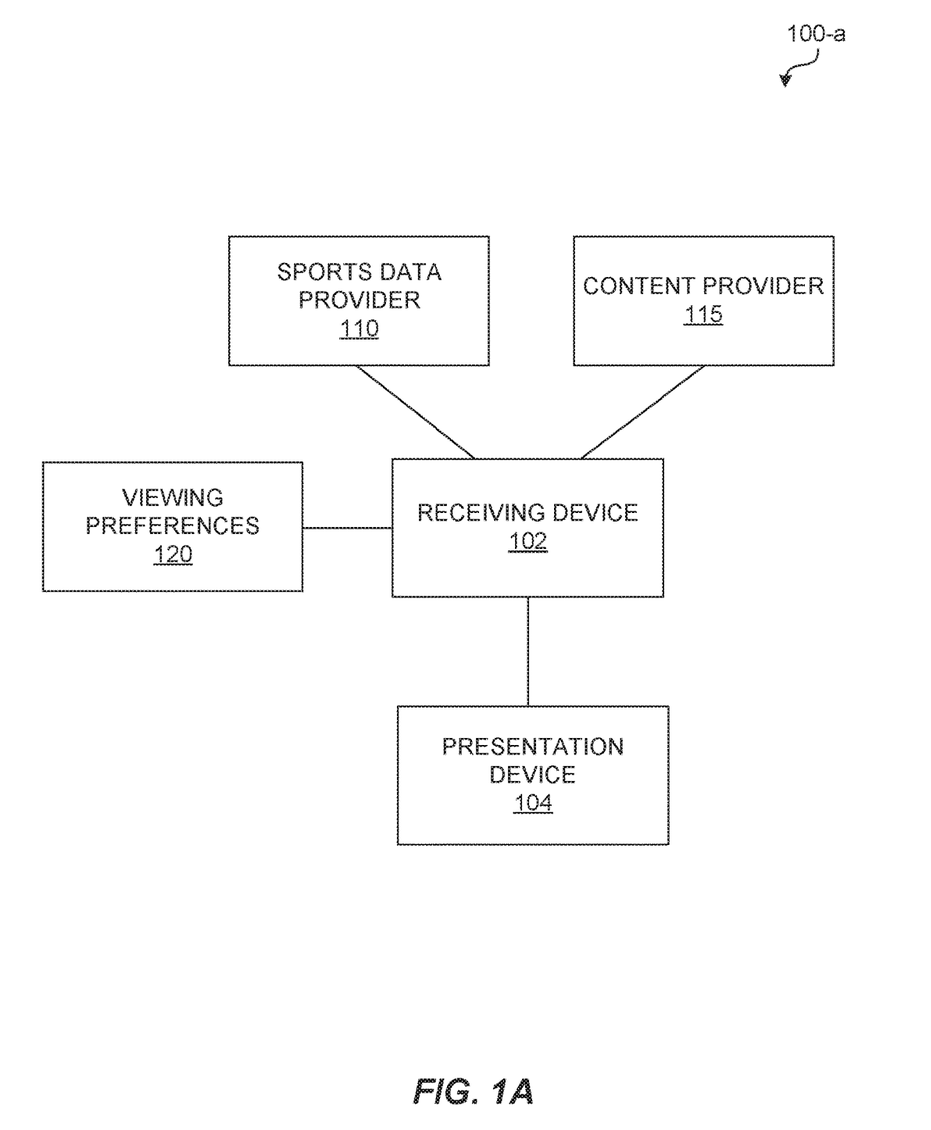
FIG. 1A illustrates an embodiment of a system 100-a for identifying sporting events that are of interest to a user.

FIG. 1A illustrates an embodiment of a system 100-a for identifying sporting events that are of interest to a user. The system of FIG. 1A is operable for identifying sporting events that are of interest to a user, and then notifying the user of the sporting event. The system 100-a includes a receiving device 102, a presentation device 104 (e.g., a display and speakers), a sports data provider 110, a content provider 115, and viewing preferences 120. The programming information may be provided by the content provider 115, or by another programming information source.

The content provider 115 provides audiovisual streams of sporting events to the receiving device 102. The content provider 115 may utilize one or more distribution networks to transmit the sporting events to the receiving device 102. Examples of content providers 115 may include a cable company, a satellite broadcasting company, a television network, an on-demand media streaming service, a pay-per-view media streaming service, and/or an over-the-top media streaming service.

The receiving device 102 may access sporting events in various ways. For example, the receiving device 102 may access a television channel by demodulating and decrypting an audiovisual stream from the content provider 115. The receiving device 102 may access an over-the-top media streaming service by logging into a remote server and downloading the sporting event over a communication network.

The communication network may be any network capable of transmitting audiovisual events and/or programming information. Exemplary communications networks include over-the-air, satellite, and cable television networks, as well as wireless communication networks, public switched telephone networks (PSTN), local area networks (LAN), and wide area networks (WAN) providing data communication services and/or Internet access. The communication network may utilize any desired combination of wired (e.g., cable and fiber) and/or wireless (e.g., cellular, satellite, microwave, and radio frequency) communication mediums and any desired network topology (or topologies when multiple mediums are utilized).

The receiving device 102 of FIG. 1 may be any device capable of receiving audiovisual streams of sporting events from the content provider 115. For example, in the case of the content provider 115 being a television network, the receiving device 102 may be a set-top box configured to communicate with the television network. The receiving device 102 may also be a digital video recorder (DVR), a computer, a portable electronic device, or similar device configured to communicate with the content provider 115.

The presentation device 104 may be any device configured to receive an audio/video stream from the receiving device 102 and present the audio/video stream to a user. Examples of the presentation device 102 include a television, a video monitor, or similar device capable of presenting audio and video information to a user. The receiving device 102 may be communicatively coupled to the presentation device 104 through any type of wired or wireless connection. Exemplary wired connections include coax, fiber, composite video and high-definition multimedia interface (HDMI). Exemplary wireless connections include WiFi, ultra-wide band (UWB) and Bluetooth. In some implementations, the presentation device 104 may be integrated with the receiving device 102. For example, each of a computer or a portable electronic device may serve as both the receiving device 102 and the presentation device 104 by providing the capability of receiving sporting events from the content provider 115, and presenting the received sporting events to a user. In another implementation, a cable-ready television may include a converter device for receiving sporting events from the content provider 115, and displaying the sporting events to a user.

The sporting event may include audio data and video data. In one embodiment, the video data includes a series of digital frames, or single images to be presented in a serial fashion to a user. Similarly, the audio data may be composed of a series of audio samples to be presented simultaneously with the video data to the user. In one example, the audio data and the video data may be formatted according to one of the MPEG encoding standards, such as MPEG-2 or MPEG-4, as may be used in DBS systems, terrestrial Advanced Television Systems Committee (ATSC) systems or cable systems. However, different audio and video data formats may be utilized.

The receiving device 102 may receive programming information that provides information about sporting events including specific dates, times, and content providers 115. The receiving device 102 may use the programming information to identify sporting events that are available to be viewed at a particular time and date. The programming information may be provided by the content provider 115, the sports data provider 110, or from other data sources.

Statistical information about sporting events is provided by the sports data provider 110. The sports data provider 110 may be a sports league (e.g., NFL, MLB, NBA, etc.), a television network (e.g., ESPN, ABC, NBC, etc.), a third-party data repository, or a crowd-sourced data repository. The sports data provider 110 provides real-time (or near real-time) statistics of sporting events that are available to be viewed. For example, the sports data provider 110 may provide the current score, active players, player statistics, team statistics, scoring statistics, or other data about a sporting event.

The receiving device 102 may also be provided with viewing preferences 120 of the user. The viewing preferences 120 may include the user's preferred sports teams, geographic locations relevant to the user (e.g., a city, state, or region of the country), the user's favorite players, or other preferences of the user regarding sporting events.

In some embodiments, the viewing preferences 120 include data related to the user's fantasy sports team and/or fantasy sports league. For example, the viewing preferences 120 may include the players or teams the user has chosen for their fantasy sports team. The viewing preferences 120 may also include the rules of the user's fantasy sports league, as well as the players selected by other users in the fantasy sports league.

The receiving device 102 analyzes the programming information, and identifies current sporting events that are available to be viewed. The available sporting events are then filtered based on the statistical information from the sports data provider 110 and the user's viewing preferences 120 to determine one or more preferred sporting events for the user. In some embodiments, the receiving device 102 determines the preferred sporting event based on the likelihood of an exciting event occurring in one or more of the available sporting events. The likelihood may be determined based on the statistical information from the sports data provider 110. For example, the statistical information may indicate that the score of a game is tied, with 30 seconds remaining in the game. Other examples of exciting events may include a player with a high batting average is at the plate or a runner is on third base and has a statistically good chance of scoring.

In some embodiments, the receiving device 102 determines the preferred sporting event based on the user's fantasy sports team and/or fantasy sports league. For example, the receiving device 102 may identify sporting events where one or more players on the user's fantasy sports team are likely to gain points for the user's fantasy sports team. The receiving device 102 may determine this likelihood based on the statistical information related to the available sporting events and the rules of the user's fantasy sports league. The receiving device 102 may also identify sporting events where one or more players on another user's fantasy sports team are likely to gain points. In this way, the receiving device may identify a preferred sporting event based on when an exciting event may occur, when a user's fantasy sports team is likely to gain points, and/or when other users' fantasy sports teams are likely to gain points.

The receiving device 102 then generates a notification to the user of the preferred sporting event. In some embodiments, the notification is displayed on the presentation device 104. For example, the notification may be displayed as a pop-up window overlaying the audiovisual content that the user is currently viewing. Alternatively or in addition, the notification may include an audio notification and/or a tactile notification. The notification may include information about the preferred sporting event, such as teams playing, score, and/or a description of the exciting event that may occur. The notification may also include a description or graphic of the current status of the game, such as player positions (e.g., first base, third base). After receiving the notification, the user may then provide an instruction to the receiving device 102 to display the sporting event.

Figure 1B:
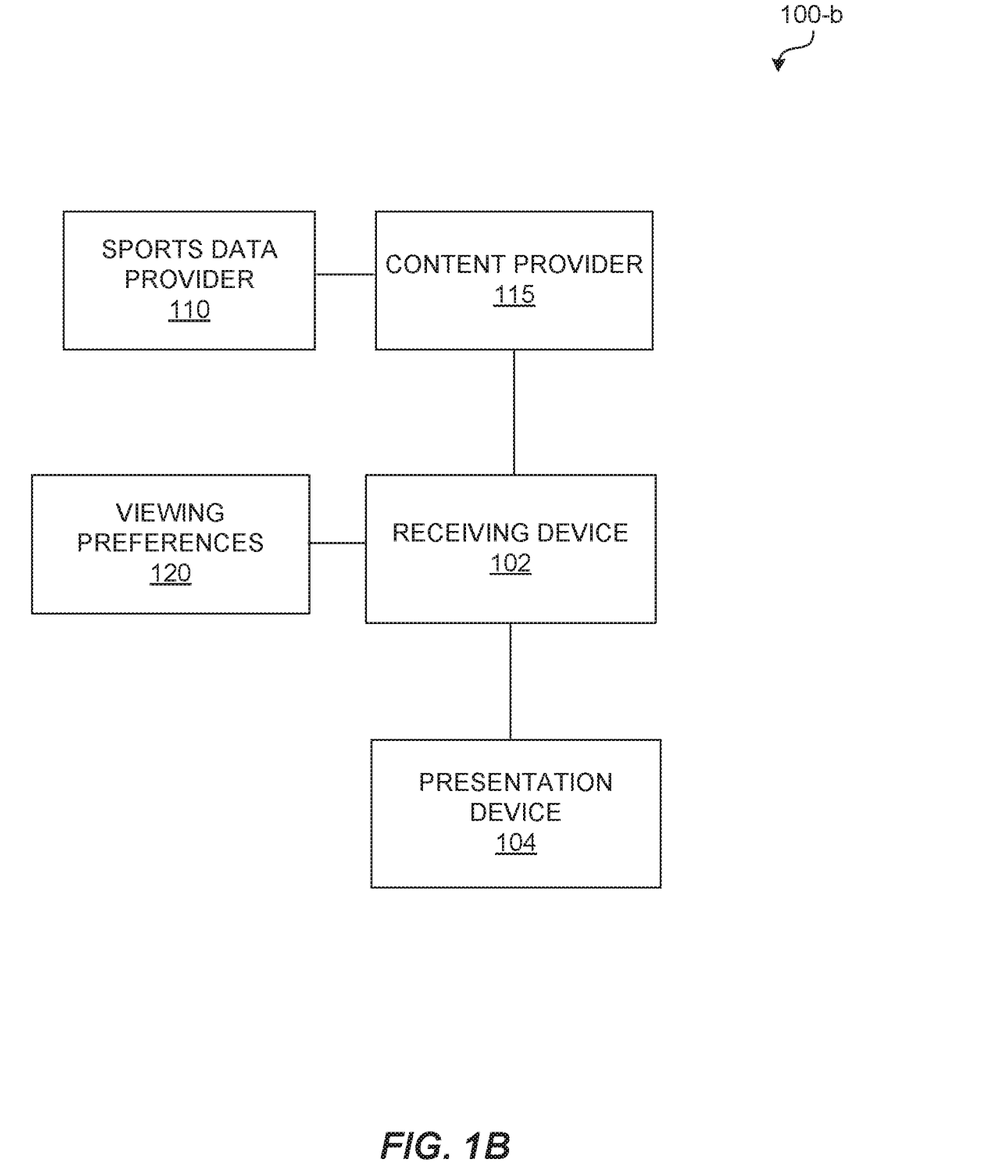
FIG. 1B illustrates an alternative embodiment of a system 100-b for identifying sporting events that are of interest to a user.

FIG. 1B illustrates an alternative embodiment of a system 100-b for identifying sporting events that are of interest to a user. The system 100-b is operable similar to the system 100-a described in reference to FIG. 1A. However, in the system 100-b, the content provider 115 receives statistical information about the sporting events from the sports data provider 110. The content provider 115 then provides the statistical information, along with the programming information and sporting events, to the receiving device 102. The receiving device 102 may then analyze the programming information, and identify current sporting events that are available to be viewed. The available sporting events are then filtered based on the statistical information from the sports data provider 110 and the user's viewing preferences 120 to determine one or more preferred sporting events for the user, as described in reference to FIG. 1A.

Figure 2:
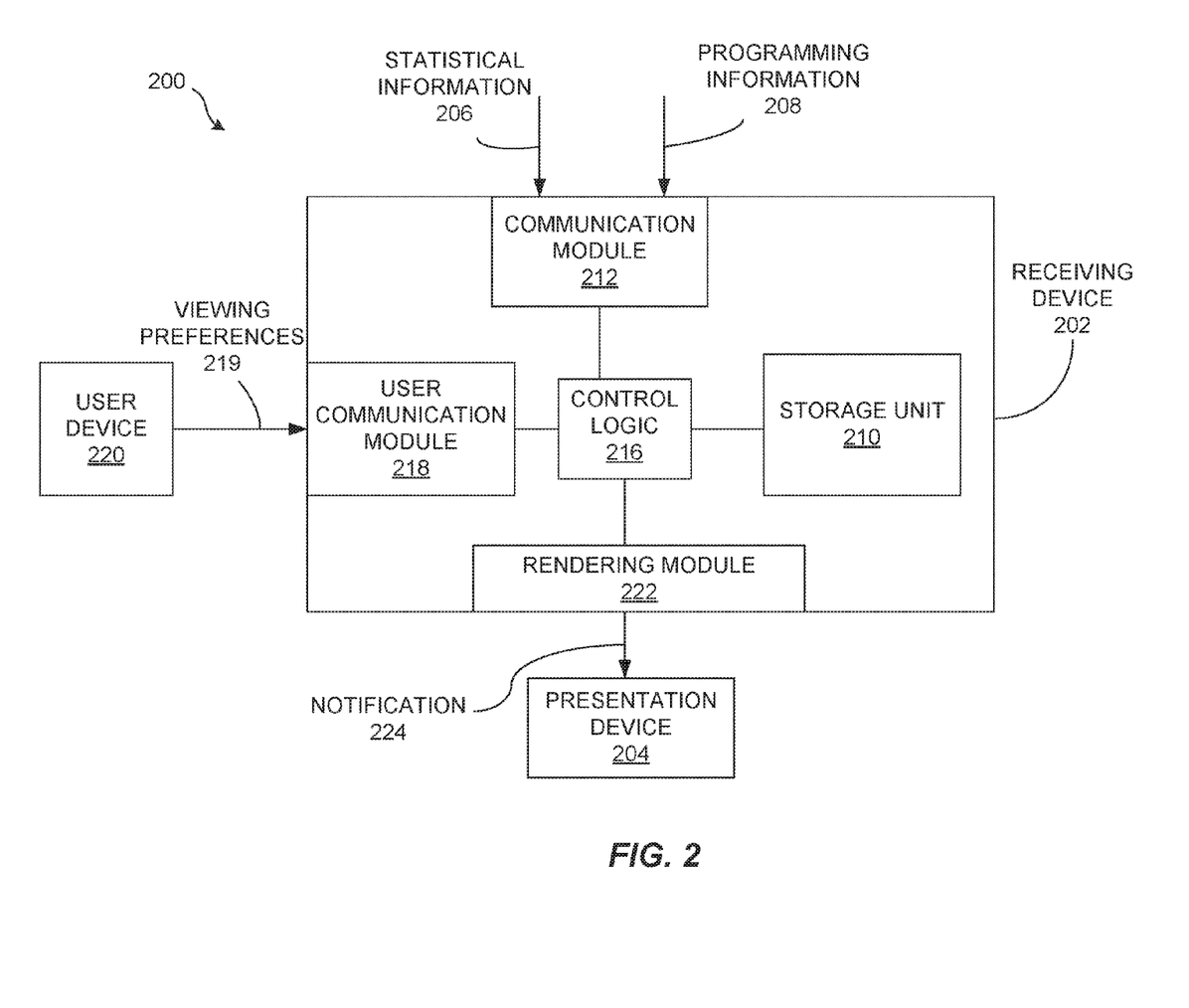
FIG. 2 illustrates an embodiment of a receiving device 202 in a system 200 for identifying sporting events that are of interest to a user.

FIG. 2 illustrates an embodiment of a receiving device 202 in a system 200 for identifying sporting events that are of interest to a user. The receiving device 202 may be an example of the receiving device 102 described in reference to FIGS. 1A and 1B. The receiving device 202 includes a communication module 212. The communication module 212 receives programming information 208 and sporting events from a content provider 115. The communication module 212 may also receive statistical information 206 about the sporting events from a sports data provider 110 or from the content provider 115.

The receiving device 202 also includes a user communication module 218. The user communication module 218 receives viewing preferences 219 from a user device 220, such as a remote control, a portable electronic device, or a computer. The user communication module 218 may also transmit notifications to the user device 220. In some alternative embodiments, the viewing preferences 219 may be transmitted to the receiving device 202 from a third-party data source, such as a server hosting the user's fantasy sports league.

The viewing preferences identify at least some of the criteria the receiving device 202 should use to identify preferred sporting events. For example, the viewing preferences may include the user's preferred sports teams, geographic locations relevant to the user (e.g., a city, state, or region of the country), the user's favorite players, or other preferences of the user regarding sporting events. Alternatively or in addition, the viewing preferences 219 may include information related to the user's fantasy sports team or league. For example, the viewing preferences 219 may include the players the user has chosen for their fantasy sports team, the rules of the user's fantasy sports league, as well as the players selected by other users in the fantasy sports league.

One or more storage units 210 may be included internal and/or external to the receiving device 202. The storage unit 210 may store the viewing preferences 219, statistical information 206, and programming information 208.

The receiving device 202 may also include a control logic 216 and a rendering module 222. The control logic 216 is operable to analyze the programming information, and identify current sporting events that are available to be viewed. The control logic 216 may then filter the available sporting events based on the statistical information from the sports data provider 110 and the user's viewing preferences 120 to determine one or more preferred sporting events for the user. The control logic 216 may then coordinate the output of a notification 224 of the preferred sporting event to the rendering module 222. The rendering module 222 may render the notification 224 as a pop-up window and output the pop-up window on a presentation device 204.

The control logic 216 may also coordinate the output of audiovisual events (such as the preferred sporting event) to the rendering module 222. The rendering module 222 renders the audiovisual event and outputs an audio/video stream to the presentation device 204. Furthermore, the receiving device 202 and system 200 may include other components, modules, elements, or devices not illustrated for the sake of brevity.

In some embodiments, the user communication module 218 may receive a user input in response to the notification 224. For example, the user input may command the receiving device 202 to render the preferred sporting event. The control logic 216 may then instruct the communication module 212 to tune to the particular broadcast channel carrying the preferred sporting event.

Alternatively, in some embodiments, the receiving device 202 may be configured to automatically record the preferred sporting event. For example, the receiving device 202 may automatically record the preferred sporting event if the user does not select to view the preferred sporting within a predetermined time window. Alternatively or in addition, if multiple preferred sporting events are identified, the receiving device may automatically record the preferred sporting event(s) that the user is not viewing. The control logic 216 may be configured to coordinate the storage of the preferred sporting event on the storage unit 210.

Figure 3:
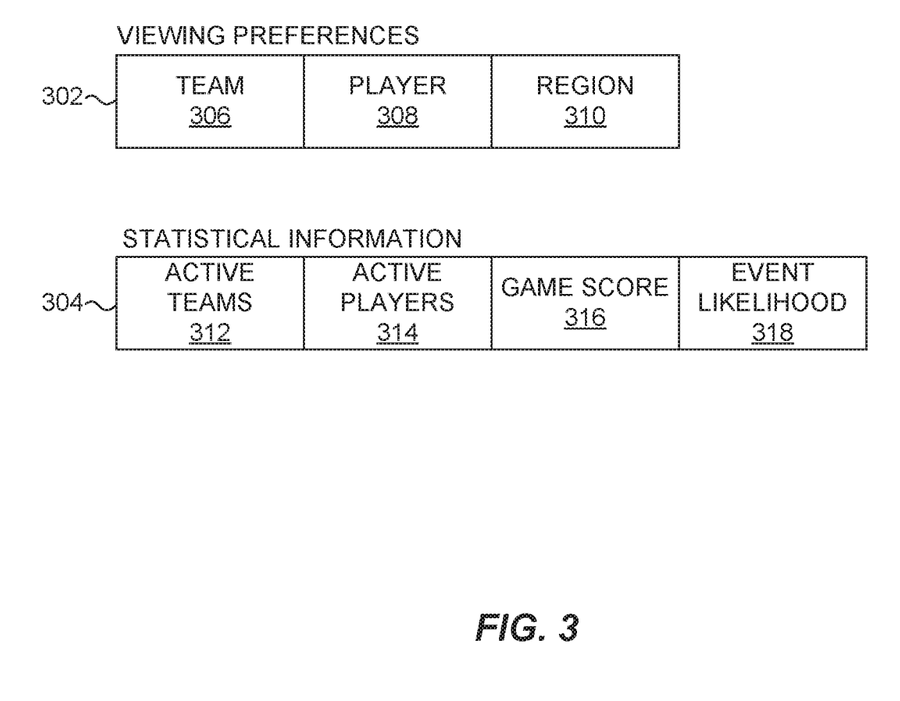
FIG. 3 illustrates an example of viewing preferences 302 and statistical information 304, as described in reference to FIGS. 1-2.

FIG. 3 illustrates an example of viewing preferences 302 and statistical information 304, as described in reference to FIGS. 1-2. The viewing preferences 302 include some of the criteria a receiving device should use to identify preferred sporting events. In some examples, the viewing preferences 302 include the user's favorite sports team(s) 306, the user's favorite player(s) 308, and geographic region(s) 310 relevant to the user (e.g., a city, state, or region of the country). The viewing preferences 302 may also include other preferences of the user regarding sporting events. In some embodiments, the viewing preferences 302 may be determined from information related to the user's fantasy sports team or league. For example, the favorite player(s) 308 may include the players the user has chosen for their fantasy sports team.

The statistical information 304 includes real-time (or near real-time) statistics of sporting events that are currently available to be viewed. In some examples, the statistical information includes active team statistics 312, active player statistics 314, the current score 316 of an active game, and/or statistics related to the likelihood of an exciting event 318. The statistical information 304 may also include other statistics related to active, past, or future sporting events.

Figure 4:
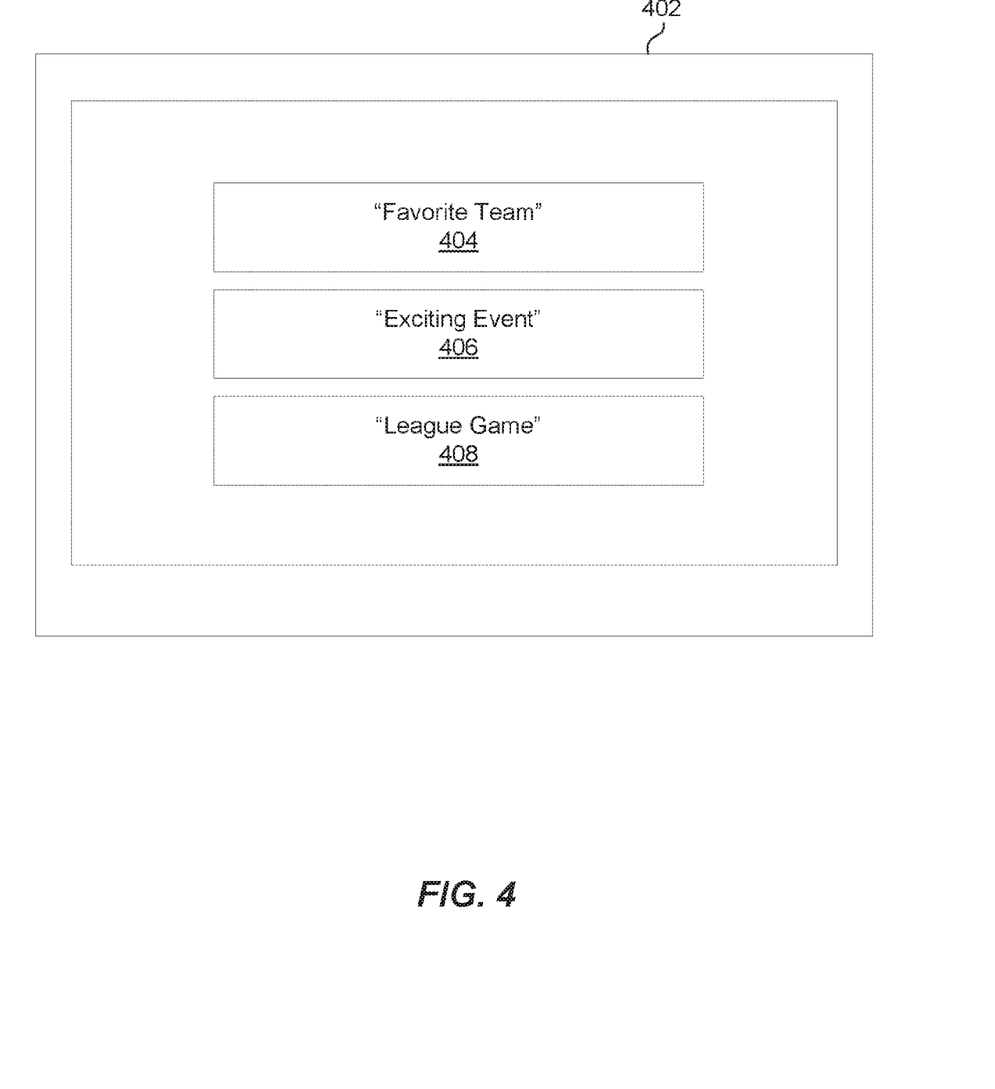
FIG. 4 illustrates an embodiment of a presentation device 402 for presenting notifications of preferred sporting events to a user.

FIG. 4 illustrates an embodiment of a presentation device 402 for presenting notifications of preferred sporting events to a user. The presentation device 402 receives the notifications from a receiving device, and then displays them as pop-up windows overlaying other content. As shown in FIG. 4, the notifications may include, for example, a "Favorite Team" notification 404, an "Exciting Event" notification 406, and a "League Game" notification 408. Other types of notifications may also be displayed based on the type of recommendation and/or sporting event. The user may then select one of the notifications, which causes the receiving device to tune to the sporting event corresponding to the selected notification.

Figure 5:
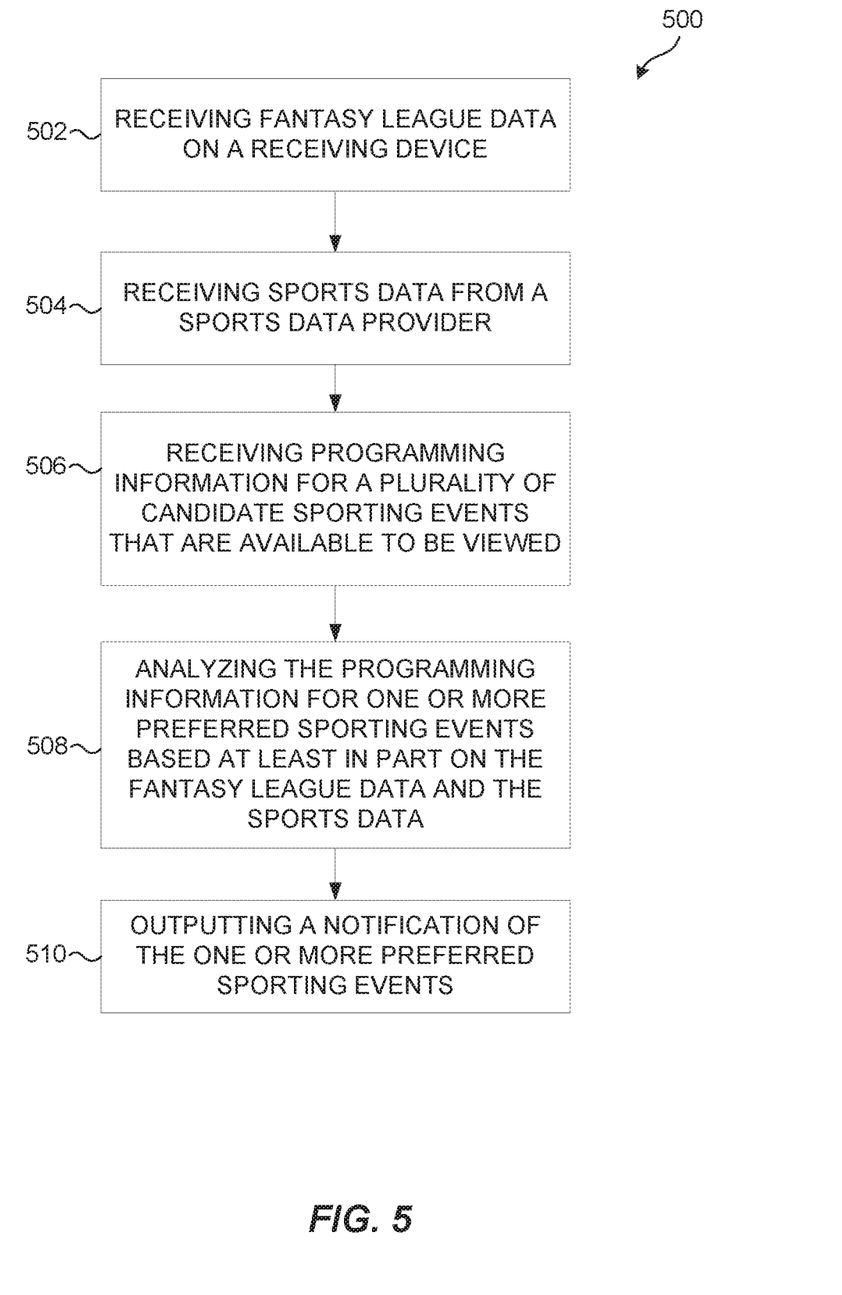
FIG. 5 illustrates an embodiment of a process 500 for identifying preferred sporting events.

FIG. 5 illustrates an embodiment of a process 500 for identifying preferred sporting events. The operations of FIG. 5 are discussed in reference to the systems and receiving devices described in reference to FIGS. 1-4. The operations of the process 500 of FIG. 5 are not all-inclusive, and may comprise additional operations described herein, and/or other operations not illustrated for the sake of brevity.

In one implementation, the process 500 includes receiving fantasy league data on a receiving device (operation 502).

The fantasy league data may include at least one player on a user's fantasy sports team, a grouping of players on the user's fantasy sports team, at least one player on another user's fantasy sports team, a grouping of players on another user's fantasy sports team, scoring rules for the user's fantasy sports league, or a combination thereof. The process 500 also receives sports data from a sports data provider (operation 504). In some embodiments, the sports data provider may be a crowd-sourced data source. The sports data may include statistics related to sporting events available to be viewed. For example, the sports data may include active team statistics, active player statistics, a game score, a likelihood of a comeback, a rivalry, a likelihood of an exciting event, or a combination thereof. The process 500 further receives programming information for a plurality of candidate sporting events that are available to be viewed (operation 506).

The process 500 then analyzes the programming information for one or more preferred sporting events based at least in part on the fantasy league data and the sports data (operation 508). The process 500 then outputs a notification of the one or more preferred sporting events (operation 510). The notification may include one or more of a visual notification, an audio notification, and a tactile notification. The notification may be output by a presentation device. In some embodiments, the notification may indicate one or more player positions, one or more players likely to gain fantasy points, a likelihood of an exciting event, a description of a game's status, a game score, or a combination thereof.

In some embodiments, the process 500 may then receive a selection of the one or more sporting events and display the selected sporting event on a presentation device. Alternatively or in addition, in some embodiments, the process 500 may automatically record one or more of the preferred sporting events. For example, if the process 500 identified multiple preferred sporting events, the process 500 may automatically record the preferred sporting events that the user did not select.

Although specific embodiments were described herein, the scope of the invention is not limited to those specific embodiments. The scope of the invention is defined by the following claims and any equivalents therein.

What is claimed is:
1. A method, comprising:
  receiving fantasy league data;
  receiving sports data from a sports data provider;
  receiving programming information for a plurality of candidate sporting events that are available to be viewed;
  analyzing the programming information based at least in part on the fantasy league data and the sports data to determine a plurality of preferred sporting events, wherein the analyzing includes:
    determining those of the plurality of candidate sporting events in which one or more players on a user's fantasy sports team are likely to gain points for the user's fantasy sports team as the preferred sporting events;
  outputting a notification of the preferred sporting events;
  automatically recording a first preferred sporting event of the preferred sporting events in an event the user does not select, within a predetermined time window, to view the first preferred sporting event;
  determining that the user is viewing a second preferred sporting event of the preferred sporting events; and automatically recording a set of sporting events that the user is not viewing, wherein the set of sporting events that the user is not viewing includes the preferred sporting events other than the second preferred sporting event.

2. The method of claim 1, further comprising:
receiving a selection of the preferred sporting events; and
displaying the selected sporting event on a presentation device.

3. The method of claim 1, further comprising:
automatically recording the preferred sporting events.

4. The method of claim 1, wherein the fantasy league data comprises at least one player on a user's fantasy sports team, a grouping of players on the user's fantasy sports team, at least one player on another user's fantasy sports team, a grouping of players on another user's fantasy sports team, scoring rules for the user's fantasy sports league, or a combination thereof.

5. The method of claim 1, wherein the sports data comprises statistics related to the plurality of candidate sporting events available to be viewed.

6. The method of claim 5, wherein the statistics comprise active team statistics, active player statistics, a game score, a likelihood of a comeback, a rivalry, a likelihood of an exciting event, or a combination thereof.

7. The method of claim 1, wherein the notification comprises one or more of a visual notification, an audio notification, and a tactile notification.

8. The method of claim 1, wherein the notification is output by a presentation device.

9. The method of claim 1, wherein the notification indicates one or more player positions, one or more players likely to gain fantasy points, a likelihood of an exciting event, a description of a game's status, a game score, or a combination thereof.

10. The method of claim 1, wherein the sports data provider is a crowd-sourced data source.

11. A receiving device, comprising:
a user communication module to receive fantasy league data;
a communication module to receive sports data and programming information for a plurality of candidate sporting events that are available to be viewed;
a control logic to analyze the programming information based at least in part on the fantasy league data and the sports data to determine one or more preferred sporting events, wherein the control logic is configured to:
determine those of the plurality of candidate sporting events in which one or more players on a user's fantasy sports team are likely to gain points as the one or more preferred sporting events; and
a rendering module to output a notification of the preferred sporting events,
wherein the control logic is configured to:
automatically record a first preferred sporting event of the preferred sporting events in an event the user does not select, within a predetermined time window, to view the first preferred sporting event,
determine that the user is viewing a second preferred sporting event of the preferred sporting events, and
automatically record a set of sporting events that the user is not viewing, wherein the set of sporting events that the user is not viewing includes the preferred sporting events other than the second preferred sporting event.

12. The receiving device of claim 11, wherein the user communication module receives a selection of the preferred sporting events, and wherein the rendering module outputs the selected sporting event to a presentation device.

13. The receiving device of claim 11, wherein the control logic automatically records the preferred sporting events.

14. The receiving device of claim 11, wherein the fantasy league data comprises at least one player on a user's fantasy sports team, a grouping of players on the user's fantasy sports team, at least one player on another user's fantasy sports team, a grouping of players on another user's fantasy sports team, scoring rules for the user's fantasy sports league, or a combination thereof.

15. The receiving device of claim 11, wherein the sports data comprises statistics related to the plurality of candidate sporting events available to be viewed.

16. The receiving device of claim 15, wherein the statistics comprise active team statistics, active player statistics, a game score, a likelihood of a comeback, a rivalry, a likelihood of an exciting event, or a combination thereof.

17. The receiving device of claim 11, wherein the notification comprises one or more of a visual notification, an audio notification, and a tactile notification.

18. The receiving device of claim 11, wherein the notification is output by a presentation device.

19. The receiving device of claim 11, wherein the notification indicates one or more player positions, one or more players likely to gain fantasy points, a likelihood of an exciting event, a description of a game's status, a game score, or a combination thereof.

20. The receiving device of claim 11, wherein the sports data provider is a crowd-sourced data source.

* * * * *